March 14, 1950     J. A. GUTHRIE     2,500,175
FLEXIBLE COUPLING
Filed March 28, 1945

INVENTOR.
John A. Guthrie
BY
Ralph L Chappell
ATTORNEY.

Patented Mar. 14, 1950

2,500,175

UNITED STATES PATENT OFFICE 2,500,175

FLEXIBLE COUPLING

John A. Guthrie, New York, N. Y.

Application March 28, 1945, Serial No. 585,375

8 Claims. (Cl. 172—36)

(Granted under the act of March 3, 1883, as amended April 30, 1928; 370 O. G. 757)

1

This invention relates to an improvement in direct-current reversible step motors, such as are used in step-by-step transmission systems.

An object of this invention is to provide a step motor that furnishes a smoother flow of power than has heretofore been possible.

Another object is to provide a step motor in which the power impulses transmitted to the motor shaft are dampened.

Another object is to provide a step motor that furnishes a relatively smooth flow of power, even with reversals of direction under load.

Figure 1:
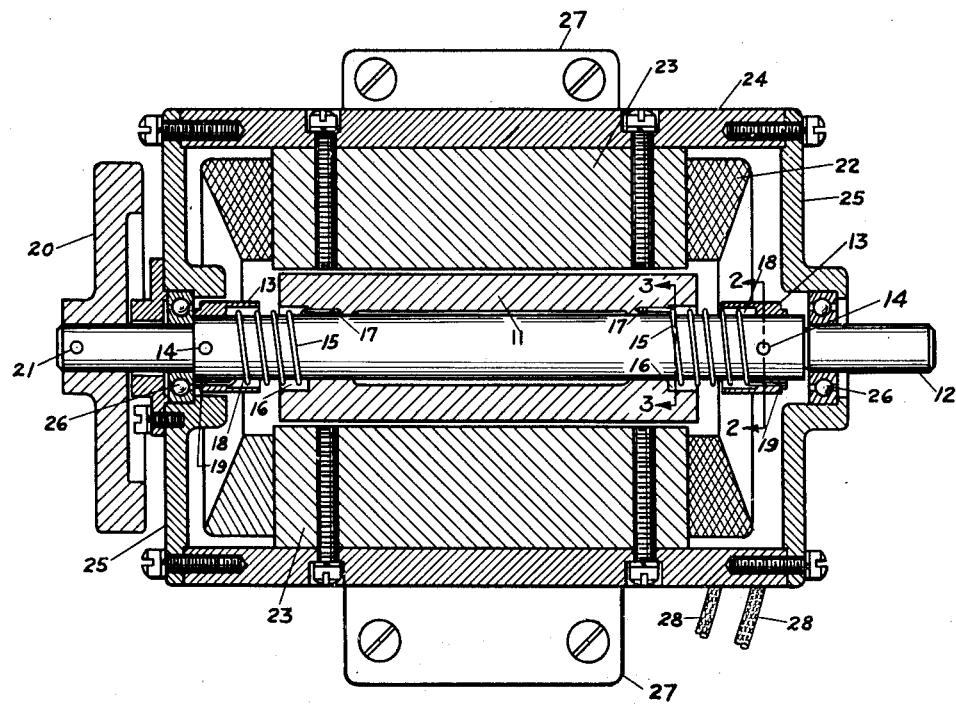
Figure 2:
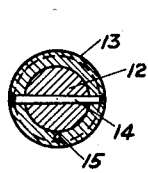
Figure 3:
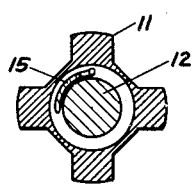

Further objects and advantages of this invention, as well as its construction, arrangement and operation, are apparent from the following description and claims in connection with the accompanying drawing, in which Fig. 1 is a longitudinal section through a direct-current reversible step motor incorporating the improvement of this invention, Fig. 2 is a vertical section along the line 2—2 of Fig. 1, and Fig. 3 is a vertical section along the line 3—3 of Fig. 1.

In the drawing there is shown at 11 a magnetic iron armature interiorly drilled throughout its length. Disposed within armature 11 and fitting slidably therein is a shaft 12. A collar 13 encircles shaft 12 on either side of armature 11, the collars 13 being fixedly secured to shaft 12 by any suitable means such as taper pins 14 (see Fig. 2). Armature 11 is flexibly connected to collars 13 by two helical springs 15 disposed about shaft 12 between armature 11 and the collars 13. Springs 15 are preferably made of steel and are provided at each end with a short straight section parallel to the center lines of the springs.

The passage through armature 11 is enlarged at either end to form annular recesses 16 adapted to receive and partly to enclose springs 15. Into the shoulders of the annular recesses 16 are drilled holes 17 adapted to receive the straight ends of springs 15. Collars 13 are similarly provided interiorly with enlarged annular recesses 18 into the shoulders of which are drilled holes 19 adapted to receive straight ends of springs 15. At one end of shaft 12 is provided a flywheel 20 suitably affixed to shaft 12 as by taper pin 21.

Field coils 22 enclose multiple pole pieces 23 secured to outer case 24 that is provided with end plates 25. End plates 25 enclose antifriction bearings 26 that support shaft 12. Mounting pads 27 project from outer case 24. Wires 28 carry the power input to the motor.

The rotary motion resulting from operation of the direct-current step motor is produced in a series of steps, or jerks. This type of motion is not desirable in indicating or other apparatus that is driven by the motor because the step motion causes shock and vibration in the driven apparatus resulting in damage or at the least in shorter life and poor and inaccurate operation. The flywheel 20 functions to smooth out the surges or steps of power produced by the step motor into a smoother flow of rotary motion.

Armature 11 is connected to shaft 12 only by the springs 15, the ends of which are engaged in collars 13 rigidly fixed to shaft 12. The straight ends of springs 15 are received in drilled holes 17 in the armature 11 and drilled holes 19 in the collars 13. The ends of springs 15 can be affixed to armature 11 and collars 13 in any other suitable manner. The springs 15, as illustrated, are both of the same hand. However, engaged as they are to opposite ends of armature 11, they exert opposite influences upon the armature 11. As armature 11 rotates in either direction relative to shaft 12, one of the springs 15 winds up and the other unwinds.

As the step motor operates, each rotary power impulse or step is transmitted to the armature 11. As the armature 11 accelerates in either direction relative to shaft 12, one of the springs 15 winds up until it binds on shaft 12, thus limiting the rotary movement of the armature 11 relative to the shaft 12 in either direction. At the same time, the other of springs 15 unwinds to accommodate the relative rotation of the armature 11 and the shaft 12. Thus each acceleration of the armature 11 relative to the shaft 12 in either direction is resisted by the actions of both of the springs 15, one resisting the tendency to wind up and the other the tendency to unwind. Each deceleration of the armature 11 relative to shaft 12 in either direction is similarly resisted by the actions of both of the springs 15, although in this case the roles of the individual springs are reversed.

In this manner sudden accelerations and decelerations of the step motor armature 11 are prevented from being transmitted directly to the shaft 12 and the apparatus driven thereby but are transmitted through springs 15 and are considerably diminished by their action. Furthermore, the combined dampening effect of the springs 15 is always the same when the motor is running in either direction and when it reverses.

The dampening effect of a single spring used as a flexible coupling between armature 11 and shaft 12 is unsatisfactory because a single spring reacts differently to successive accelerations and decelerations in different directions. In the case of a single spring, rotation of the armature relative to the shaft in one direction is definitely limited because of eventual binding of the spring on the shaft, whereas relative rotation in the other direction is not so limited, but can result in a much greater angular deflection, being resisted as it is only by the resistance of the spring against unwinding. This unlimited unwinding in one direction has been found to cause frequent spring breakage, resulting in a temporary breakdown of the apparatus, often at a critical time. The present invention substantially eliminates such breakage.

While the invention has been disclosed as applied to a motor, it can be applied to a dynamo of the type wherein sudden angular motions are converted into electrical impulses transmitted to distant electrically responsive devices. It can also be applied to flexible couplings for transmitting rotary power.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a dynamo-electric machine, the combination of an armature interiorly drilled throughout its length and a shaft extending therethrough, two helical springs of the same hand encircling said shaft, said springs being disposed one on each side of said armature in balanced longitudinal relationship, the ends of said springs adjacent to said armature being affixed to said armature, the other ends of said springs being affixed to said shaft.

2. In a motor of the direct-current reversible step type, the combination of a magnetic iron armature interiorly drilled throughout its length and a shaft extending therethrough, two collars encircling said shaft and rigidly affixed thereto, said collars being disposed one on each side of said armature, and two helical springs of the same hand encircling said shaft in balanced longitudinal relationship, said springs being disposed one on each side of said armature between said armature and said collars, each of said springs having one end affixed to the adjacent collar and the other end affixed to the adjacent end of the armature, said armature, shaft, collars and springs all having a common axis.

3. In a dynamo-electric machine, the combination of an armature and a shaft supporting said armature, and two helical springs of the same hand encircling said shaft, said springs being disposed one on each side of said armature in balanced longitudinal relationship, the ends of said springs adjacent to said armature being affixed to said armature, the other ends of said springs being affixed to said shaft.

4. In a dynamo-electric machine having a pair of relatively movable members, the combination with one of said members of a support, and two helical springs of the same hand with their axes aligned, said springs being disposed one on each side of said one member in balanced relationship, the ends of said springs adjacent to said one member being affixed to said one member, the other ends of said springs being affixed to said support.

5. In a dynamo-electric machine, the combination of an armature and a shaft supporting said armature, and two helical springs of the same hand encircling said shaft, said springs being disposed one on each side of said armature in balanced longitudinal relationship, the ends of said springs adjacent to said armature being affixed to said armature, the other ends of said springs being affixed to said shaft, said springs upon relative rotation of said armature and shaft through a predetermined angle being arranged to bind upon said shaft to limit further relative rotation in the same direction, one of said springs serving to limit relative rotation in one direction and the other spring serving to limit relative rotation in the opposite direction.

6. In a rotor-stator machine, the combination of a rotor and a shaft supporting said rotor, and two helical springs of the same hand encircling said shaft, said springs being disposed one on each side of said rotor in balanced longitudinal relationship, the ends of said springs adjacent to said rotor being affixed to said rotor, the other ends of said springs being affixed to said shaft, the internal diameter of each spring helix in normal position being only slightly greater than the outside diameter of the encircled shaft.

7. In a flexible coupling a pair of axially-aligned members mounted for relative rotary displacement, and two helical springs of the same hand encircling the axis, said springs being disposed one on each side of one of said members in balanced longitudinal relationship, the ends of said springs adjacent to said one member being affixed to said one member, the other ends of said springs being affixed to the other member, the internal diameter of each spring helix in normal position being only slightly greater than one of said members.

8. In a rotor-stator machine, the combination of a rotor and a shaft supporting said rotor, and two helical springs of the same hand encircling said shaft, said springs being disposed one on each side of said rotor in balanced longitudinal relationship, the ends of said springs adjacent to said rotor being affixed to said rotor, the other ends of said springs being affixed to said shaft, the internal diameter of each spring helix in normal position being only slightly greater than the outside diameter of the encircled shaft, said springs upon relative rotation of said rotor and shaft through a predetermined angle being arranged to bind upon said shaft to limit further relative rotation in the same direction, one of said springs serving to limit relative rotation in one direction and the other spring serving to limit relative rotation in the opposite direction.

JOHN A. GUTHRIE.

REFERENCES CITED

The following references are of record in the file of this patent:

UNITED STATES PATENTS

| Number | Name | Date |
|---|---|---|
| 511,448 | McCormick | Dec. 26, 1893 |
| 741,290 | Wood | Oct. 13, 1903 |
| 1,327,132 | Bendix | Jan. 6, 1920 |
| 1,331,090 | Bijur | Feb. 17, 1920 |
| 1,756,689 | Jenkins | Apr. 29, 1930 |
| 2,220,751 | Bergman | Nov. 5, 1940 |
| 2,331,699 | Kirby | Oct. 12, 1943 |

FOREIGN PATENTS

| Number | Country | Date |
|---|---|---|
| 129,661 | Switzerland | Jan. 2, 1929 |